United States Patent
Wu et al.

(10) Patent No.: US 11,670,781 B2
(45) Date of Patent: Jun. 6, 2023

(54) FUEL CELL BIPOLAR FLOW FIELD PLATE AND FUEL CELL STACK

(71) Applicant: National Tsing Hua University, Hsinchu (TW)

(72) Inventors: Ting-Cheng Wu, Hsinchu (TW); Fan-Gang Tseng, Hsinchu (TW); Fu-Lien Lin, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 17/704,032

(22) Filed: Mar. 25, 2022

(65) Prior Publication Data

US 2022/0376273 A1  Nov. 24, 2022

(30) Foreign Application Priority Data

May 24, 2021  (TW) ................. 110118600

(51) Int. Cl.
*H01M 8/0263* (2016.01)
*H01M 8/0206* (2016.01)
*H01M 8/0213* (2016.01)

(52) U.S. Cl.
CPC ....... *H01M 8/0263* (2013.01); *H01M 8/0206* (2013.01); *H01M 8/0213* (2013.01)

(58) Field of Classification Search
CPC .................................................... H01M 8/02
See application file for complete search history.

(56) References Cited

U.S. PATENT DOCUMENTS

| | | | | |
|---|---|---|---|---|
| 6,348,280 | B1* | 2/2002 | Maeda ................ | H01M 8/0263 429/514 |
| 2005/0115825 | A1* | 6/2005 | Frank .................. | H01M 8/0263 204/253 |
| 2006/0068267 | A1* | 3/2006 | Frank ..................... | H01M 8/02 429/480 |
| 2008/0003484 | A1* | 1/2008 | Chen .................... | H01M 8/2418 429/514 |
| 2008/0226963 | A1* | 9/2008 | Wang ................. | H01M 8/0258 429/434 |

(Continued)

FOREIGN PATENT DOCUMENTS

CN      2580609     10/2003
CN      100416899    9/2008

(Continued)

OTHER PUBLICATIONS

DE102006010832A1—machine translation (Year: 2007).*

(Continued)

*Primary Examiner* — Haroon S. Sheikh
(74) *Attorney, Agent, or Firm* — JCIPRNET

(57) ABSTRACT

A fuel cell bipolar flow field plate and a fuel cell stack are provided. The fuel cell bipolar flow field plate includes a first gas channel and a second gas channel. Each of the gas channels has several sub-channels, each of the sub-channels has bending parts, and adjacent sub-channels have opposite flow directions. The sub-channels of the two gas channels form a four-leaf clover type pattern in a reaction area of the fuel cell bipolar flow field plate. A bending angle of each of the bending parts in the four-leaf clover type pattern is within 90 degrees.

9 Claims, 9 Drawing Sheets

(56) References Cited

U.S. PATENT DOCUMENTS

| | | | | |
|---|---|---|---|---|
| 2009/0011305 A1* | 1/2009 | Lee | ............... | H01M 8/0265 |
| | | | | 429/437 |
| 2010/0227257 A1* | 9/2010 | Takeguchi | ............ | H01M 8/241 |
| | | | | 429/514 |
| 2011/0189576 A1* | 8/2011 | Saito | ................ | H01M 8/04097 |
| | | | | 429/455 |
| 2021/0299719 A1* | 9/2021 | Hori | ........................ | B21B 13/02 |

FOREIGN PATENT DOCUMENTS

| | | |
|---|---|---|
| CN | 102983337 | 3/2013 |
| DE | 102006010832 | 9/2007 |
| DE | 102006059857 | 6/2008 |

OTHER PUBLICATIONS

Fe'lix Barreras, et al., "Optimal design and operational tests of a high-temperature PEM fuel cell for a combined heat and power unit", International Journal of Hydrogen Energy vol. 39, Issue 10, Dec. 15, 2013, pp. 5388-5398.

* cited by examiner

FUEL CELL BIPOLAR FLOW FIELD PLATE AND FUEL CELL STACK

CROSS-REFERENCE TO RELATED APPLICATION

This application claims the priority benefit of Taiwanese application no. 110118600, filed on May 24, 2021. The entirety of the above-mentioned patent application is hereby incorporated by reference herein and made a part of this specification.

BACKGROUND

Technical Field

The disclosure relates to a fuel cell design, and particularly relates to a fuel cell bipolar flow field plate and a fuel cell stack.

Related Art

Fuel cells are one of today's most popular renewable energy sources. However, in a fuel cell, an increase in the cell area may cause problems such as non-uniform gas concentration and excessive flow resistance inside the cell, resulting in reduced power generation performance and durability of the fuel cell.

The above problems are mainly related to the channel design of a bipolar plate. The bipolar plate is a channel for gas input. In fuel cell applications, as the fuel cell is increased in area, with the reaction of the fuel, a fuel flow field provided by the bipolar plate may have different fuel concentrations between an inlet end, an outlet end and the entire flow field. Also, due to an increase in the area of the bipolar plate, the length of a channel is increased, thereby increasing flow resistance of the flow field. In order to reduce the flow resistance, additional pumps may be needed to provide a pressure difference between the inlet and the outlet and increase flow velocity, and additional energy consumption is increased.

SUMMARY

The disclosure provides a fuel cell bipolar flow field plate, in which pressure difference and flow resistance of a flow field are reduced, thereby reducing a concentration difference across the entire flow field. Thus, a uniform reaction can be realized in a fuel cell, and the fuel cell can be improved in both performance and service life.

A fuel cell bipolar flow field plate of the disclosure has a reaction area and includes a first gas channel and a second gas channel. The first gas channel has multiple first sub-channels, each first sub-channel connects a first outlet with a first inlet, and each first sub-channel has multiple first bending parts. The second gas channel has multiple second sub-channels, each second sub-channel connects a second outlet with a second inlet, and each second sub-channel has multiple second bending parts. The second sub-channels and the first sub-channels are alternately disposed. Each second sub-channel and its adjacent first sub-channel have opposite flow directions. The first sub-channels and the second sub-channels form a four-leaf clover type pattern in the reaction area. A bending angle of each first bending part and each second bending part in the four-leaf clover type pattern is within 90 degrees.

In an embodiment of the disclosure, the first inlet and the second outlet may be disposed on a first side of the fuel cell bipolar flow field plate. The second inlet and the first outlet may be disposed on a second side of the fuel cell bipolar flow field plate. The first side and the second side are opposite each other.

In an embodiment of the disclosure, the total area of the first sub-channels and the second sub-channels in the reaction area accounts for, for example, 40% to 60%, with respect to the area of the reaction area taken as 100%.

In an embodiment of the disclosure, a width of each of the first sub-channels is, for example, 0.5 cm to 1.5 cm.

In an embodiment of the disclosure, a width of each of the second sub-channels is, for example, 0.5 cm to 1.5 cm.

In an embodiment of the disclosure, the fuel cell bipolar flow field plate may further include a first communication channel that connects each first inlet.

In an embodiment of the disclosure, the fuel cell bipolar flow field plate may further include a second communication channel that connects each second inlet.

A fuel cell stack of the disclosure includes the above-mentioned fuel cell bipolar flow field plate.

In another embodiment of the disclosure, a material of the fuel cell bipolar flow field plate includes, for example, a carbon material or metal.

Based on the above, in the disclosure, fuel required for a fuel cell is supplied through channels having opposite directions, and a difference in concentration of the fuel in the cell is reduced. Moreover, through the design of sub-channels in the four-leaf clover type pattern, flow resistance, pressure drop and flow velocity in the gas channels as a whole are reduced, thereby improving durability and performance of the fuel cell.

To make the aforementioned more comprehensible, embodiments accompanied with drawings are described in detail as follows.

DESCRIPTION OF THE EMBODIMENTS

Figure 1:
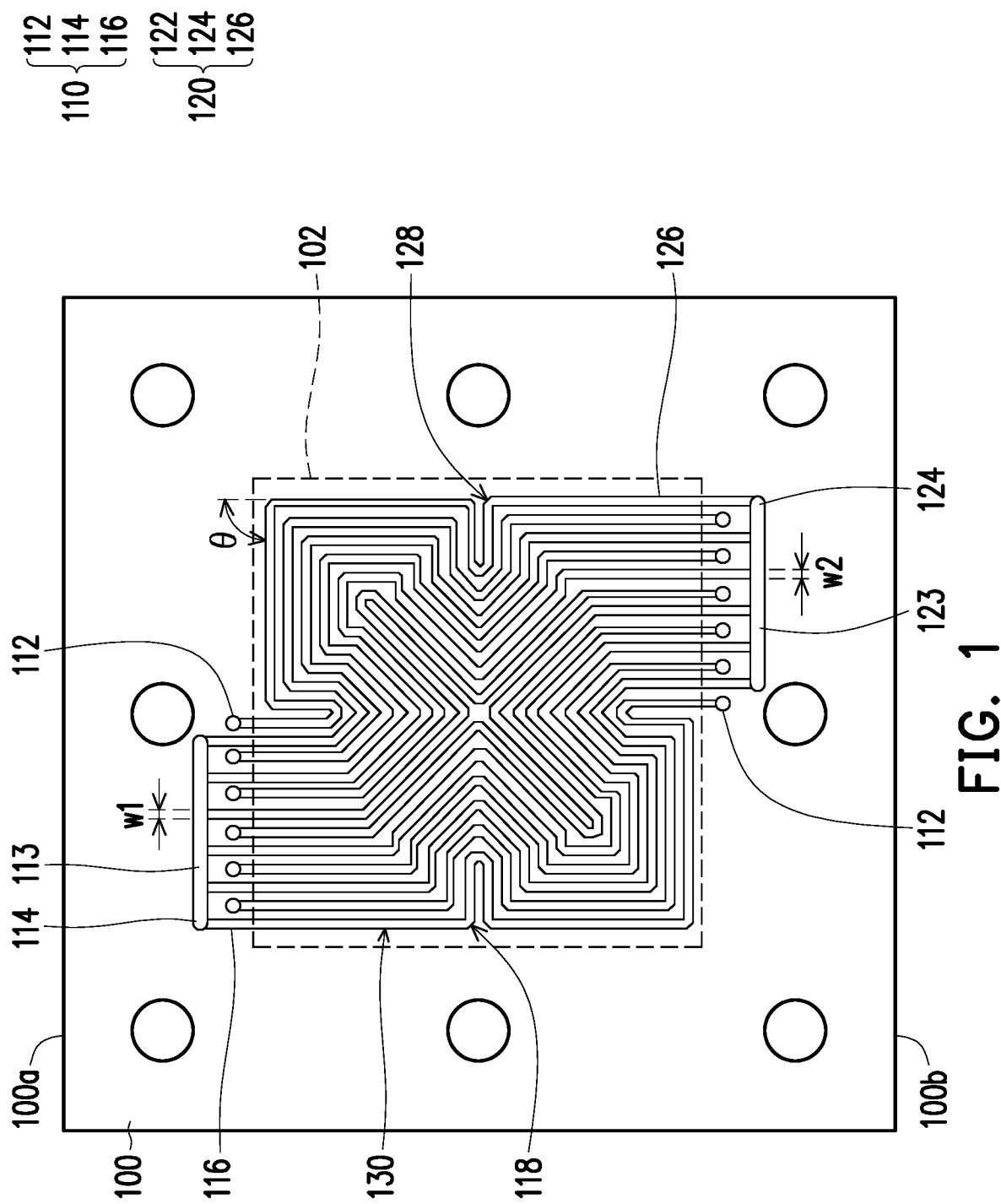
FIG. 1 is a schematic plan view of a fuel cell bipolar flow field plate according to an embodiment of the disclosure.

Exemplary embodiments of the disclosure will be described below with reference to the drawings, but the disclosure may be embodied in various different forms and should not be construed as being limited to the embodiments described below. For clarity, in the drawings, sizes and widths of regions, portions and channels may not be drawn based on actual scales. To facilitate understanding, in the following description, the same elements will be denoted by the same reference numerals.

FIG. 1 is a schematic plan view of a fuel cell bipolar flow field plate according to an embodiment of the disclosure.

Referring to FIG. 1, a fuel cell bipolar flow field plate 100 of the present embodiment has a reaction area 102 and includes a first gas channel 110 and a second gas channel 120. The first gas channel 110 has multiple first sub-channels 116. Each first sub-channel 116 connects a first outlet 114 with a first inlet 112. Each first sub-channel 116 has multiple (for example, eight or more) first bending parts 118. However, the disclosure is not limited thereto, and the number of the first bending part 118 may be increased or decreased according to the design of the first sub-channel 116. Similarly, the second gas channel 120 has multiple second sub-channels 126. Each second sub-channel 126 connects a second outlet 122 with a second inlet 124. Each second sub-channel 126 has multiple (for example, eight or more) second bending parts 128. However, the disclosure is not limited thereto, and the number of the second bending part 128 may be increased or decreased according to the design of the second sub-channel 126. Moreover, the second sub-channels 126 and the first sub-channels 116 are alternately disposed, so that each second sub-channel 126 and its adjacent first sub-channel 116 have opposite flow directions. That is, each first sub-channel 116 and its adjacent second sub-channel 126 also have opposite flow directions. The second sub-channel 126 and the first sub-channel 116 form a four-leaf clover type pattern 130 in the reaction area 102. A bending angle θ of each first bending part 118 and each second bending part 128 in the four-leaf clover type pattern 130 is within 90 degrees. The term "bending angle" mentioned herein refers to an angle formed in each bending part by a change in direction from the channel upstream to the channel downstream.

In the present embodiment, since the first sub-channel 116 and its adjacent second sub-channel 126, which are alternately disposed, have opposite flow directions, a difference in concentration of the fuel in the cell can be reduced. Moreover, by designing the bending angle θ in the four-leaf clover type pattern 130 to be no more than 90 degrees, flow resistance, pressure drop and flow velocity in the first gas channel 110 and the second gas channel 120 can be reduced. Therefore, it is expected to increase durability and performance of a fuel cell using such a bipolar flow field plate.

In FIG. 1, the first inlet 114 and the second outlet 122 are disposed on a first side 100a of the fuel cell bipolar flow field plate 100. The second inlet 124 and the first outlet 112 are disposed on a second side 100b of the fuel cell bipolar flow field plate 100. The first side 100a and the second side 100b are opposite each other, which facilitates gas flow. FIG. 1 further shows a first communication channel 113 that connects each of the first inlets 114, and a three-dimensional view thereof is shown in FIG. 2.

Figure 2:
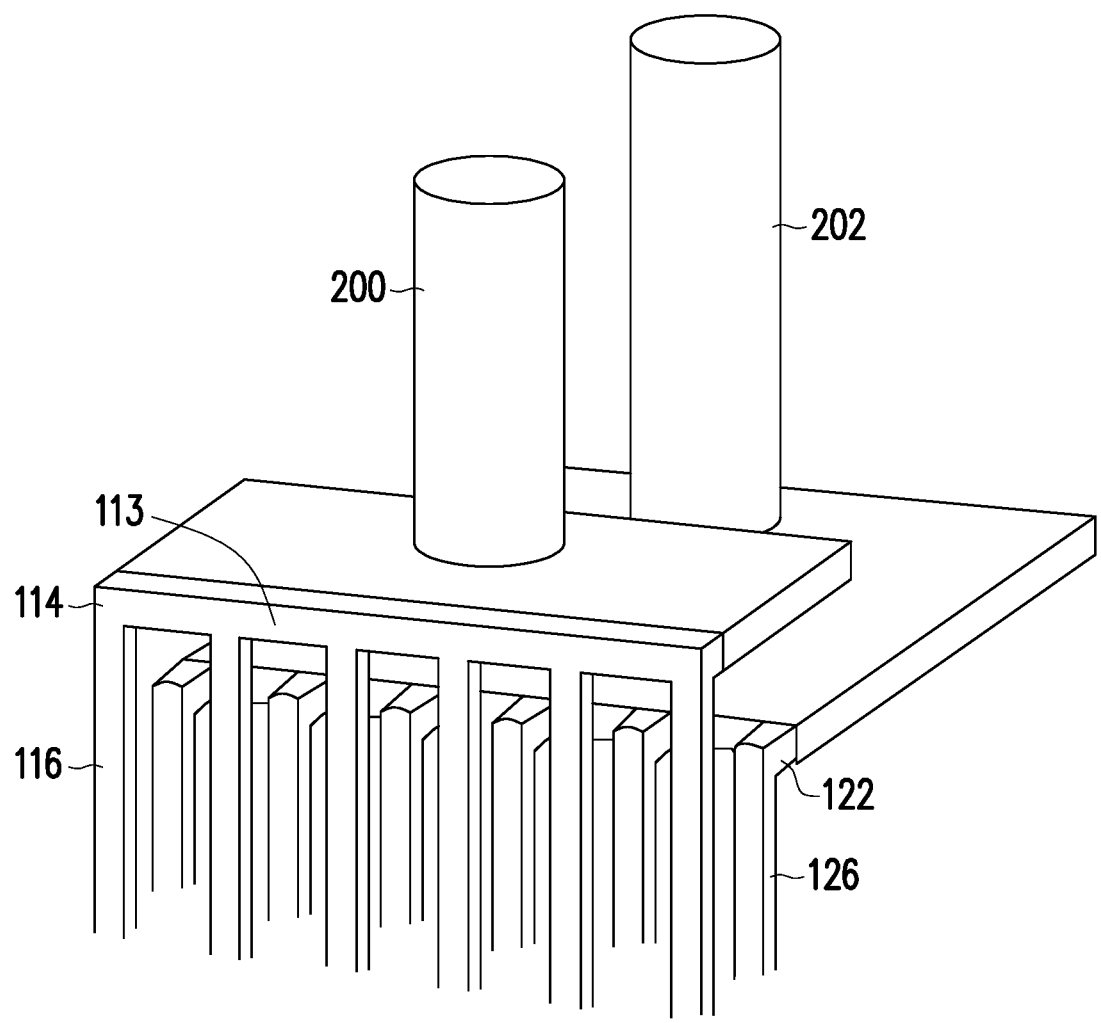
FIG. 2 is a schematic three-dimensional view of channels of the fuel cell bipolar flow field plate of FIG. 1.

FIG. 2 is a schematic three-dimensional view of some channels, in which positions of the channels (instead of the entire fuel cell bipolar flow field plate) are shown. That is, gas fuel entering through a first fuel inlet pipe 200 first reaches the first communication channel 113, so as to obtain a uniform concentration of the gas fuel. Then, the gas fuel separately enters each first sub-channel 116 from the first inlet 114. Gas fuel transferred from the second sub-channel 126 to the second outlet 122 leaves the fuel cell bipolar flow field plate and reaches a second fuel outlet pipe 202. Based on the same rationale, a second communication channel 123 that connects each second inlet 124 also achieves a uniform concentration of the gas fuel. However, the disclosure is not limited thereto. In one embodiment, a communication channel may be disposed at all the inlets and outlets of the first gas channel 110 and the second gas channel 120. In another embodiment, there is no communication channel disposed at all the inlets and outlets of the first gas channel 110 and the second gas channel 120.

Referring still to FIG. 1, when taking the area of the reaction area 102 as 100%, the total area of the first sub-channels 116 and the second sub-channels 126 in the reaction area 102 accounts for, for example, 40% to 60%, preferably 45% to 55%. For example, when a ratio of a single (sub-)channel to a land is 1:1 and an appropriate chamfer (for example, a chamfer having a radius close to the width of the channel) is formed on the outside of a bending part, the total area of the first sub-channels 116 and the second sub-channels 126 accounts for about 50%. In one embodiment, a width w1 of each first sub-channel 116 is about 0.5 cm to 1.5 cm, and a width w2 of each second sub-channel 126 is about 0.5 cm to 1.5 cm. However, the disclosure is not limited thereto, and the width w1 and the width w2 may be smaller or greater than the values given above.

Figure 3:
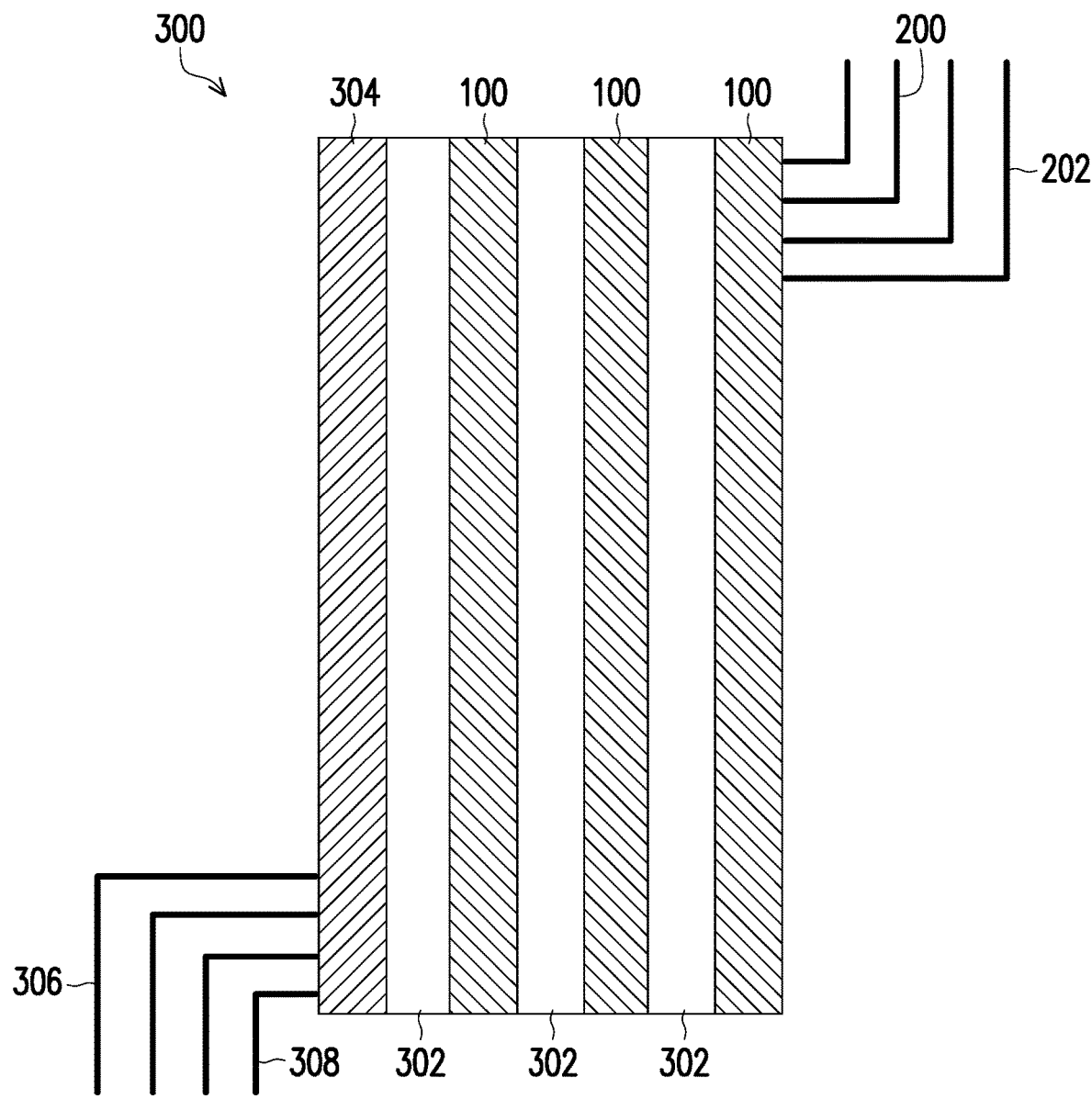
FIG. 3 is a schematic cross-sectional view of a fuel cell stack according to another embodiment of the disclosure.

FIG. 3 is a schematic cross-sectional view of a fuel cell stack according to another embodiment of the disclosure. The same reference numerals as those in the previous embodiment denote the same or similar members, and the same or similar members can be understood with reference to the related description of the previous embodiment and will not be described again.

Referring to FIG. 3, a fuel cell stack 300 of the present embodiment may include the fuel cell bipolar flow field plate 100, and a material of the fuel cell bipolar flow field plate 100 may be selected from a carbon material (such as graphite or a carbon composite) or metal (such as stainless steel). The fuel cell stack 300 generally includes a membrane electrode assembly 302 interposed between the fuel cell bipolar flow field plates 100, and also an end plate 304. In addition, the first fuel inlet pipe 200, the second fuel outlet pipe 202, a first fuel outlet pipe 306, and a second fuel inlet pipe 308 are disposed accordingly. However, the disclosure is not limited thereto. A detailed structure of the fuel cell stack 300 may be modified according to requirements and in line with the existing technology. For example, an additional gas diffusion layer (not shown) may be provided between the membrane electrode assembly 302 and the fuel cell bipolar flow field plate 100.

The following describes experiments carried out in order to verify the effect of the disclosure. However, the disclosure is not limited to the following content.

Experimental Example

A bipolar flow field plate as shown in FIG. 1 was fabricated to have an area of 5 cm×5 cm.

Figure 5:
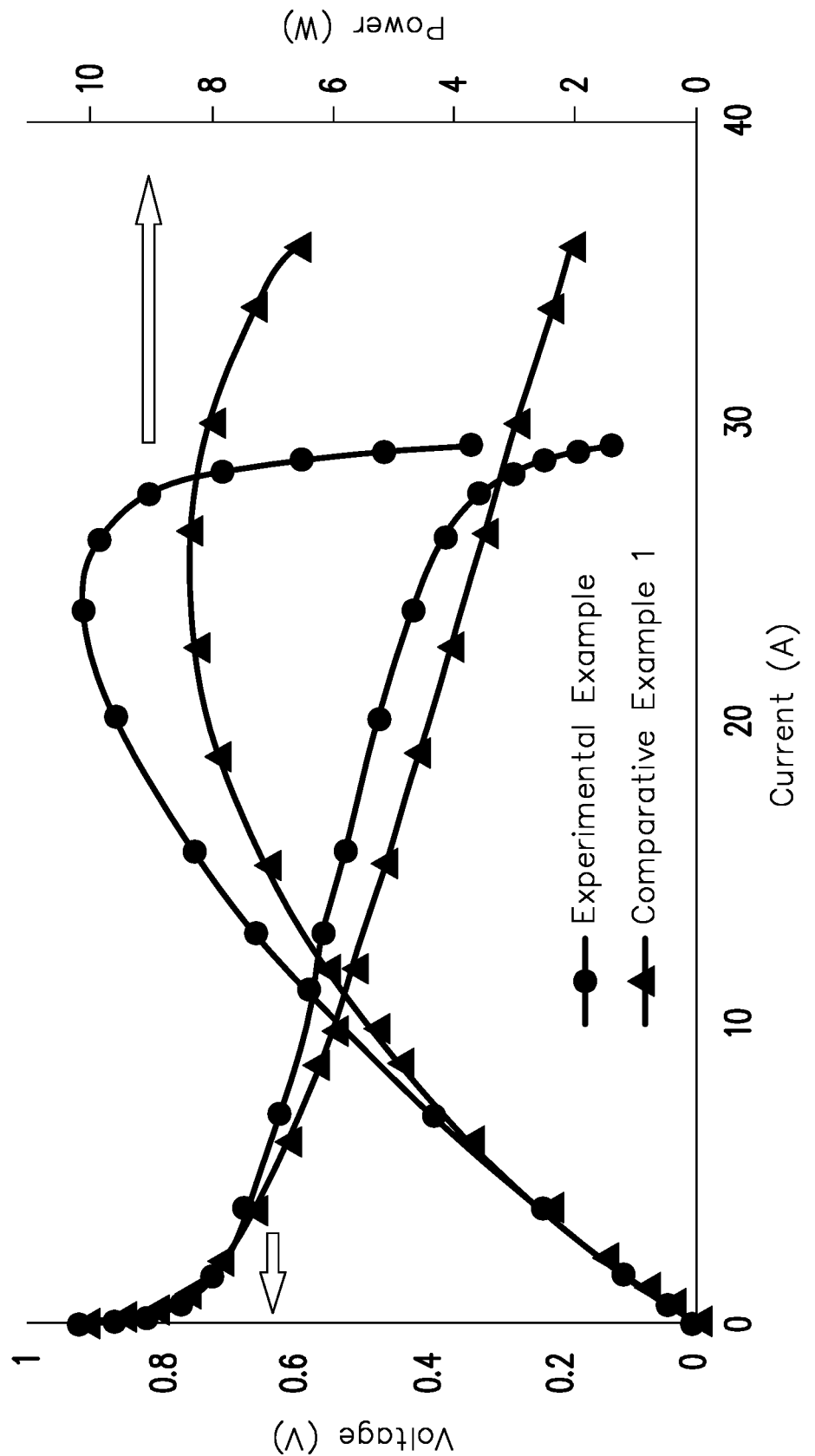
FIG. 5 is a graph of a performance comparison between an experimental example and a comparative example.

Then, the bipolar flow field plate was assembled to obtain a single fuel cell, in which a fuel flow rate was set to 300 sccm. Performance of the fuel cell was measured, and the results are shown in FIG. 5.

Comparative Example

Figure 4:
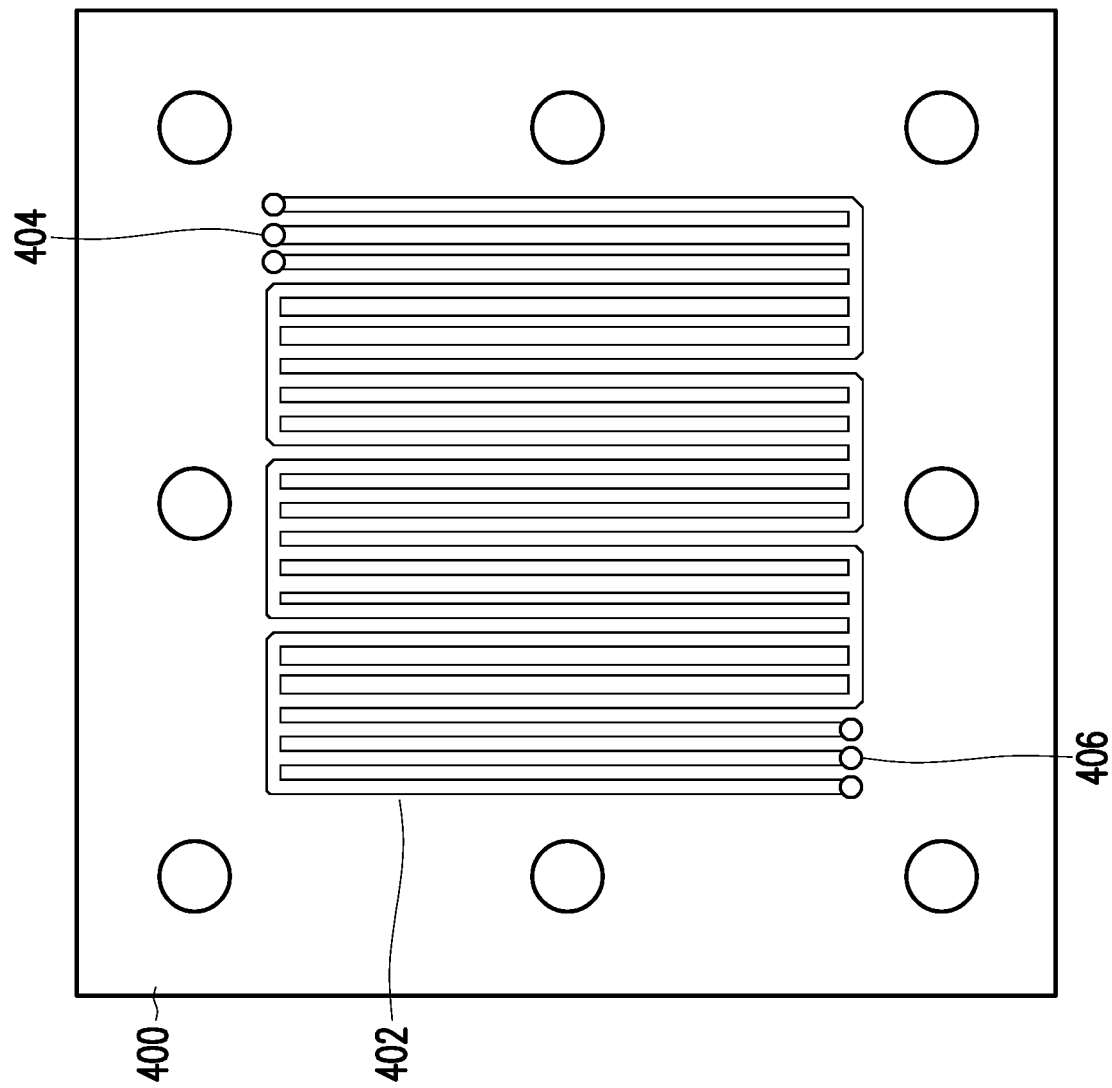
FIG. 4 is a schematic view of a bipolar flow field plate of Comparative Example 1.

A serpentine flow field plate 400 as shown in FIG. 4 was fabricated. The serpentine flow field plate 400 had the same overall size (and the same size of the reaction area) as the experimental example. However, the serpentine flow field plate 400 employed a serpentine channel 402, and had an inlet 404 and an outlet 406 each only on one side thereof. Thus, a gas in the serpentine channel 402 flows in a single flow direction.

Similarly to the experimental example, the serpentine flow field plate 400 was assembled to obtain a single fuel cell, in which a fuel flow rate was set to 300 sccm. Performance of the fuel cell was measured, and the results are shown in FIG. 5.

As is clear from FIG. 5, the experimental example was superior to the comparative example in both voltage and power. Therefore, it is evident that the disclosure improves the performance of the fuel cell.

Simulation Experimental Example

Figure 6:
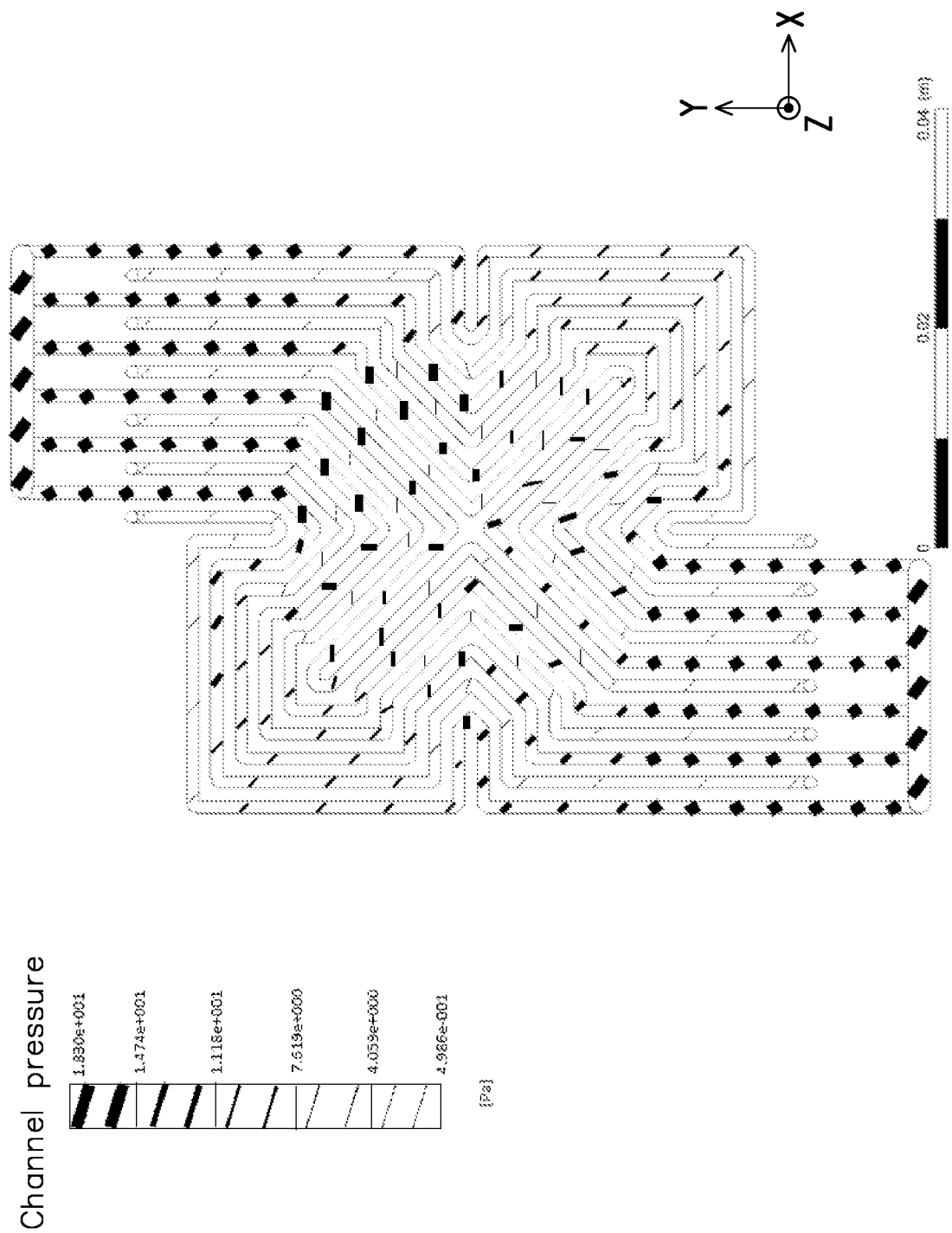
FIG. 6 illustrates a pressure field of a simulation experimental example.
Figure 7:
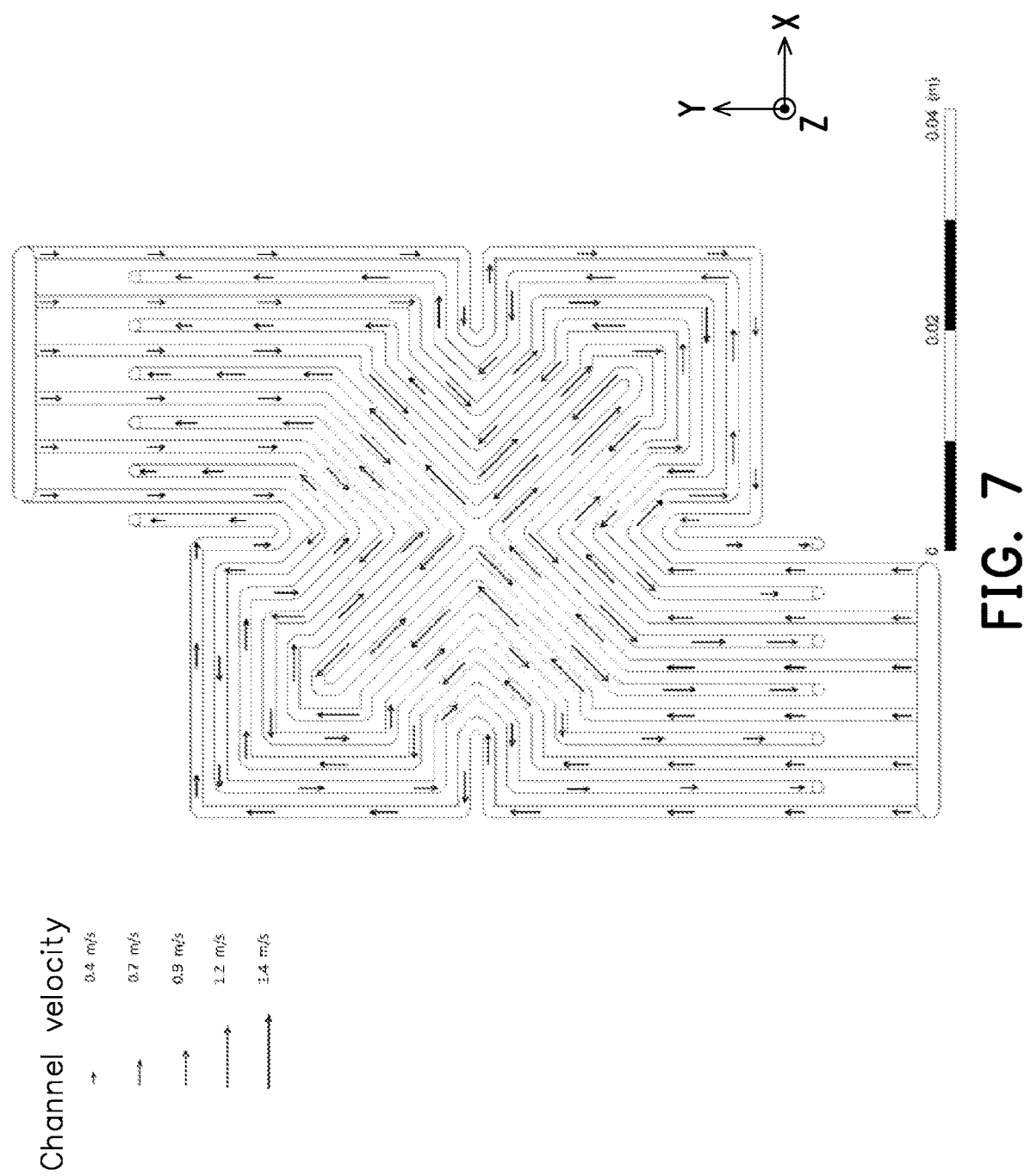
FIG. 7 illustrates a flow velocity field of the simulation experimental example.

Pressure field and flow velocity field of a bipolar flow field plate as shown in FIG. 1 were simulated, and the results are shown in FIG. 6 and FIG. 7.

Simulation Comparative Example

Figure 8:
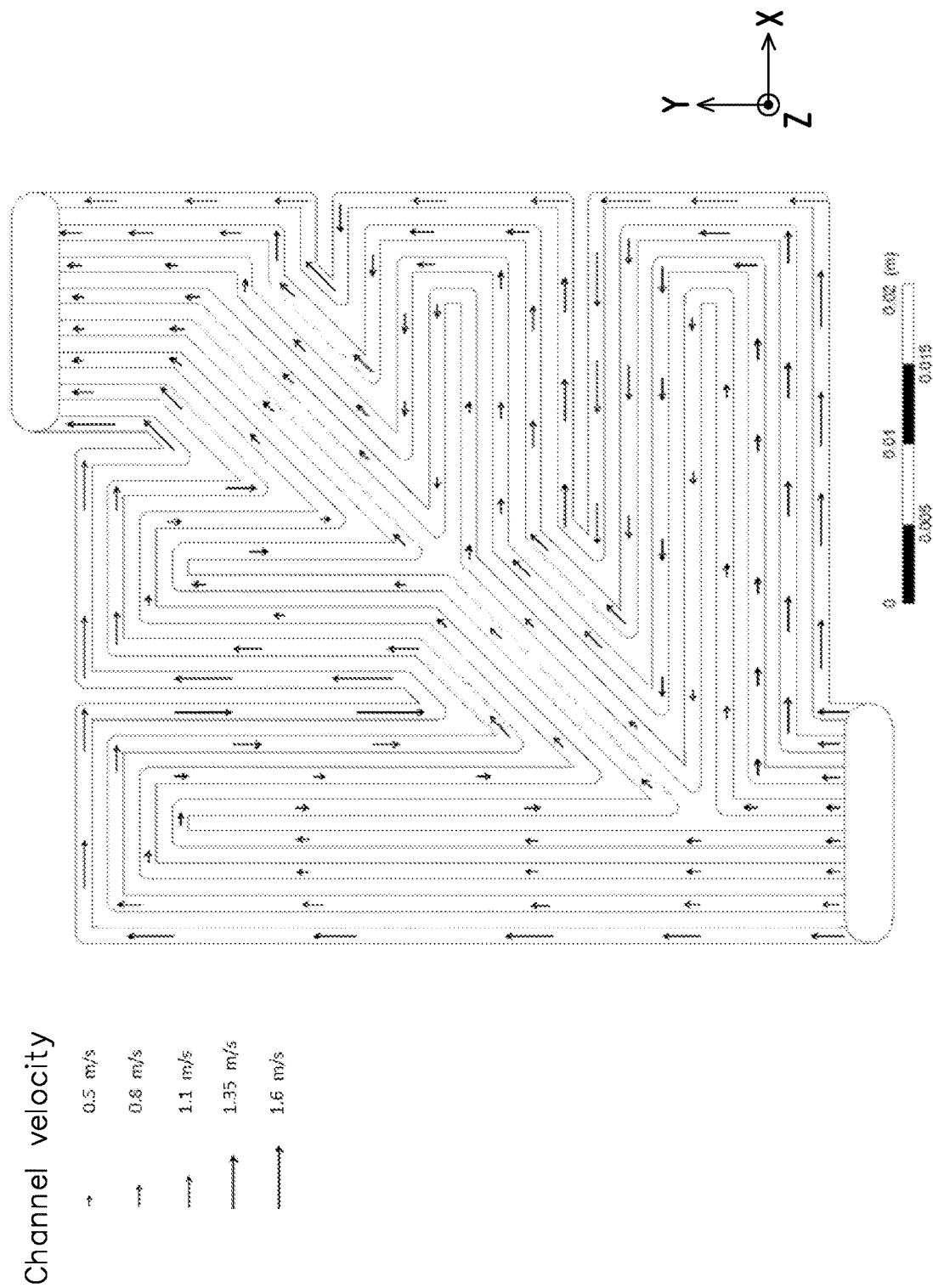
FIG. 8 illustrates a flow velocity field of a simulation comparative example.
Figure 9:
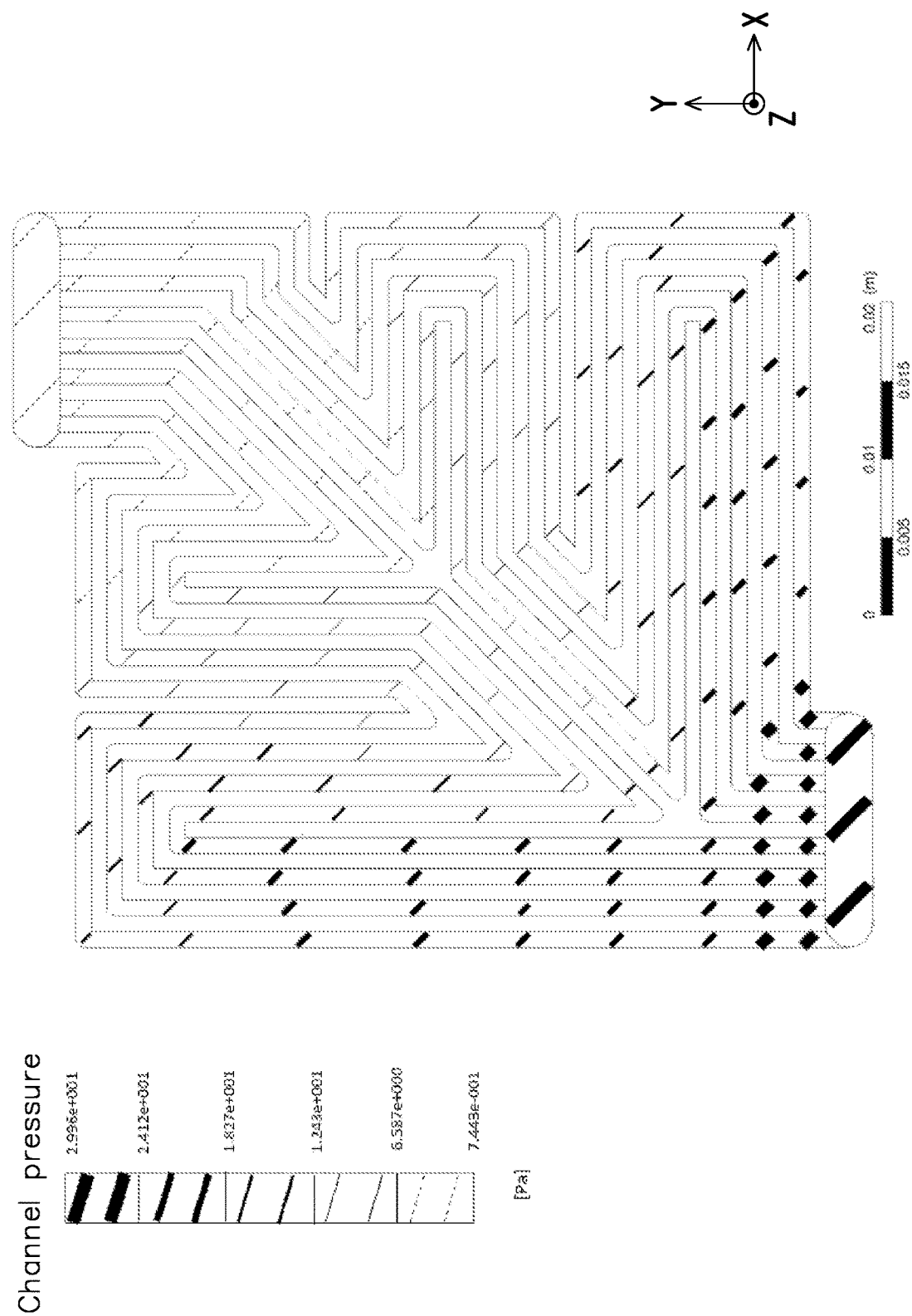
FIG. 9 illustrates a pressure field of the simulation comparative example.

Flow velocity field and pressure field of a herringbone flow field plate were simulated, and the results are shown in FIG. 8 and FIG. 9.

As is clear from FIG. 7 and FIG. 8, a maximum flow velocity of the four-leaf clover type flow field plate was lower than that of the herringbone flow field plate. Thus, more reaction time was allowed for the fuel in the channel to diffuse to the membrane electrode assembly, and a reaction rate of the fuel was increased.

With respect to the pressure field (see FIG. 6 and FIG. 9), it is clear that a pressure drop of the four-leaf clover type flow field plate was less than that of the herringbone flow field plate by 50% or more. Thus, when the four-leaf clover type flow field plate is used in assembling a fuel cell stack, energy consumption required for a pump can be significantly reduced and the overall efficiency of the fuel cell stack can be improved.

Moreover, as is clear from both diagrams of pressure field and velocity field, the four-leaf clover type flow field plate had relatively uniform pressure difference and velocity difference across the entire reaction area, and no non-uniformity was observed.

Although the disclosure has been described with reference to embodiments thereof, it will be apparent to one of ordinary skill in the art that modifications and variations may be made without departing from the spirit of the disclosure. Accordingly, the scope of the disclosure will be defined by the attached claims.

What is claimed is:

1. A fuel cell bipolar flow field plate, having a reaction area and comprising:
    a first gas channel having a plurality of first sub-channels, each of the plurality of first sub-channels connecting a first outlet with a first inlet, each of the plurality of first sub-channels having a plurality of first bending parts; and
    a second gas channel having a plurality of second sub-channels, each of the plurality of second sub-channels connecting a second outlet with a second inlet, each of the plurality of second sub-channels having a plurality of second bending parts, wherein the plurality of second sub-channels and the plurality of first sub-channels are alternately disposed, each of the plurality of second sub-channels and its adjacent first sub-channel have opposite flow directions, and
    the plurality of second sub-channels and the plurality of first sub-channels form a four-leaf clover type pattern in the reaction area, wherein a bending angle of each of the plurality of first bending parts and each of the plurality of second bending parts in the four-leaf clover type pattern is within 90 degrees.

2. The fuel cell bipolar flow field plate according to claim 1, wherein the first inlet and the second outlet are disposed on a first side of the fuel cell bipolar flow field plate, the second inlet and the first outlet are disposed on a second side of the fuel cell bipolar flow field plate, and the first side and the second side are opposite each other.

3. The fuel cell bipolar flow field plate according to claim 1, wherein total area of the plurality of first sub-channels and the plurality of second sub-channels in the reaction area accounts for 40% to 60% with respect to area of the reaction area taken as 100%.

4. The fuel cell bipolar flow field plate according to claim 1, wherein a width of each of the plurality of first sub-channels is 0.5 cm to 1.5 cm.

5. The fuel cell bipolar flow field plate according to claim 1, wherein a width of each of the plurality of second sub-channels is 0.5 cm to 1.5 cm.

6. The fuel cell bipolar flow field plate according to claim 1, further comprising a first communication channel connecting each of the first inlets.

7. The fuel cell bipolar flow field plate according to claim 1, further comprising a second communication channel connecting each of the second inlets.

8. A fuel cell stack, comprising the fuel cell bipolar flow field plate according to claim 1.

9. The fuel cell stack according to claim 8, wherein a material of the fuel cell bipolar flow field plate comprises a carbon material or metal.

* * * * *